Nov. 28, 1950 W. F. BERCK 2,531,603
POSITIVE DISPLACEMENT TYPE FLUID METER
Original Filed Sept. 17, 1945 6 Sheets—Sheet 1

Fig.1.

INVENTOR.
WILLIAM F. BERCK
BY
Mellin, Auricht Hanscom
ATTORNEYS

Nov. 28, 1950 W. F. BERCK 2,531,603
POSITIVE DISPLACEMENT TYPE FLUID METER
Original Filed Sept. 17, 1945 6 Sheets-Sheet 2

INVENTOR
WILLIAM F. BERCK

BY
Mellin, Aurich & Hanscom
ATTORNEYS

Nov. 28, 1950 — W. F. BERCK — 2,531,603
POSITIVE DISPLACEMENT TYPE FLUID METER
Original Filed Sept. 17, 1945 — 6 Sheets-Sheet 3

INVENTOR.
WILLIAM F. BERCK
BY
Mellin, Aurich & Hanscom
ATTORNEYS

Nov. 28, 1950 W. F. BERCK 2,531,603
POSITIVE DISPLACEMENT TYPE FLUID METER
Original Filed Sept. 17, 1945 6 Sheets-Sheet 4

INVENTOR
WILLIAM F. BERCK
BY
Mellin, Aurich & Hanscom
ATTORNEYS

Nov. 28, 1950 W. F. BERCK 2,531,603
POSITIVE DISPLACEMENT TYPE FLUID METER
Original Filed Sept. 17, 1945 6 Sheets-Sheet 5

INVENTOR
WILLIAM F. BERCK

BY
Mellin, Aurich & Hanscom
ATTORNEYS

INVENTOR
WILLIAM F. BERCK

BY
Mellin, Aurich + Hanscom
ATTORNEYS

Patented Nov. 28, 1950

2,531,603

UNITED STATES PATENT OFFICE 2,531,603

POSITIVE DISPLACEMENT TYPE FLUID METER

William F. Berck, Hayward, Calif., assignor to Ralph N. Brodie Company, Oakland, Calif., a corporation of California Continuation of application Serial No. 616,724, September 17, 1945. This application September 29, 1947, Serial No. 776,756

9 Claims. (Cl. 121—71)

This invention relates to fluid meters.

This application is a continuation of my application for "Fluid Meter," Serial No. 616,724, filed September 17, 1945, now abandoned.

It is the principal object of my present invention to provide an improved liquid meter of the positive displacement type which has substantially constant hydraulic characteristics and mechanical balance and which employs a pair of complemental meshing rotors operated by a pressure differential between the inlet and outlet sides of the meter to accurately and efficiently measure liquid passing through the meter with a minimum of pressure drop.

One form which the invention may assume is exemplified in the following description and illustrated by way of example in the accompanying drawings, in which.

Referring more particularly to the accompanying drawings, 10 indicates a meter of the displacement type. This meter comprises a primary meter casing 11 (hereinafter referred to as the meter casing) and an enclosing secondary casing 12. The latter houses auxiliary devices used in connection with gasoline meters and the like, which form no part of the present invention. The secondary casing also constitutes a receiving medium for the fluid to be measured, to feed the same to the inlet of the meter 10, and a medium for receiving the fluid passing from the outlet of the meter 10. Needless to say, the meter 10 is interposed in the casing 12 in a manner that the fluid delivered to the casing 12 must pass through the meter 10 to discharge from the casing 12.

The meter casing 11 is formed interiorly with two cylinder bores 14 and 15, the axes of which are in parallelism. These cylinder bores 14 and 15 extend between the head members 16 and 17 of the meter casing 11. The axial centers of the bores 14 and 15 are so spaced apart relative to the diameters of the bores 14 and 15 that the latter intersect, forming a communicating opening 18 between the cylinder bores 14 and 15.

The cylinder bore 14 is of a diameter greater than the cylinder bore 15 as shown. The precise relationship of the diameters of the cylinder bores is, as will be described hereinafter, determined by the formation of complemental rotors 19 and 20 which are rotatably mounted therein.

The rotor 20 is fixed on a shaft 21 journalled in bearings 22 carried by the head members 16 and 17. The rotor 19 is fixed on a shaft 23 journalled in bearings 24 carried by the head members 16 and 17. Exteriorly of the head member 17, the shafts 21 and 23 are fitted with meshing gears 24a to cause opposite rotation of the rotors at predetermined relative speeds. Formed interiorly of the meter casing 11 exteriorly of the cylinder bores 14 and 15 at one side thereof is an inlet chamber 25. This chamber 25 communicates with the interior of the bores 14 and 15 through inlet ports 26, which circumferentially overlie the said bores 14 and 15, and with the exterior of the casing through a circumferentially disposed port 27.

An outlet chamber 28 is similarly formed in the meter casing at the opposite side of the cylinder bores 14 and 15 from the inlet chamber 25 and communicates with said bores 14 and 15 through a single outlet port 29. This outlet chamber 28 communicates with the exterior of the meter casing 11 through an axially disposed port 30 formed through the head member 16.

Figure 4:
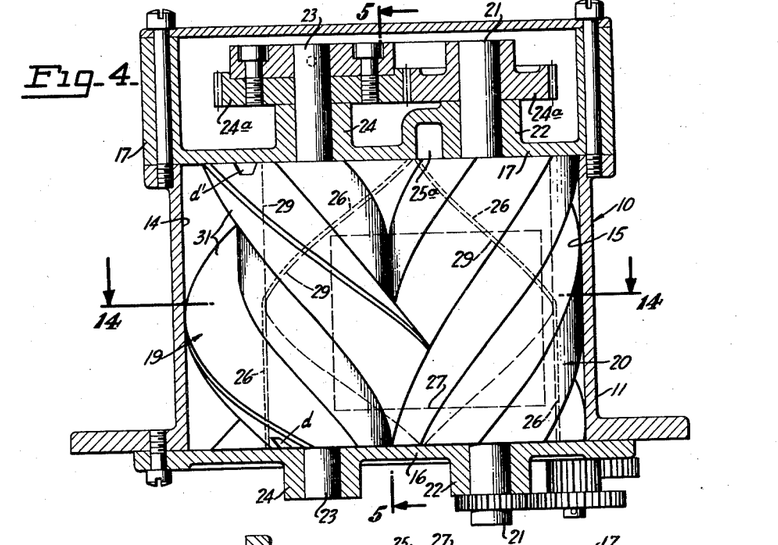
Fig. 4 is a view in plan, partially in section, through the meter taken on line 4—4 of Fig. 2 and shifted through 180° in the plane of the paper, the inlet port having been superimposed in broken lines.
Figure 5:
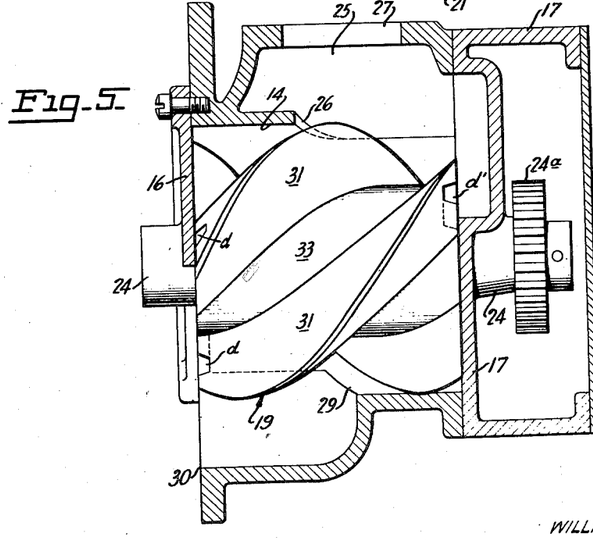
Fig. 5 is a view in longitudinal section taken along line 5—5 of Fig. 4.
Figure 6:
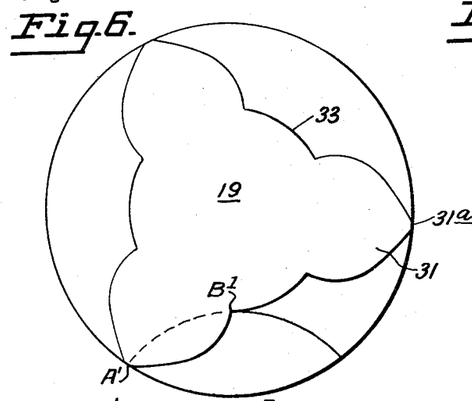
Figs. 6 to 9, inclusive, are correlated diagrammatic views of the two rotors, showing the manner in which the liquid seal between the rotors is formed.
Figure 7:
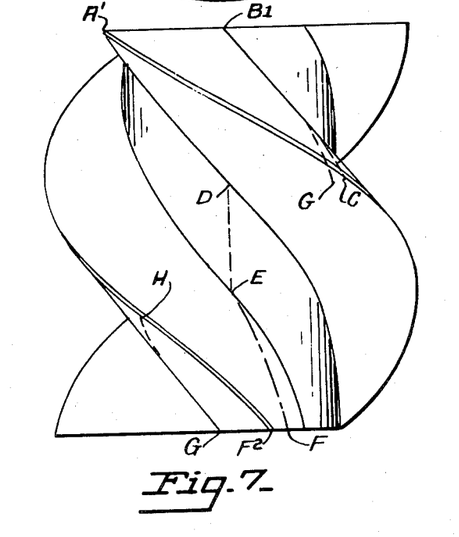
Figure 8:
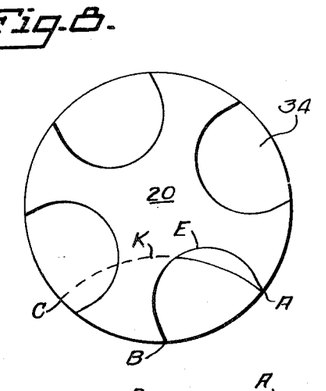
Figure 9:
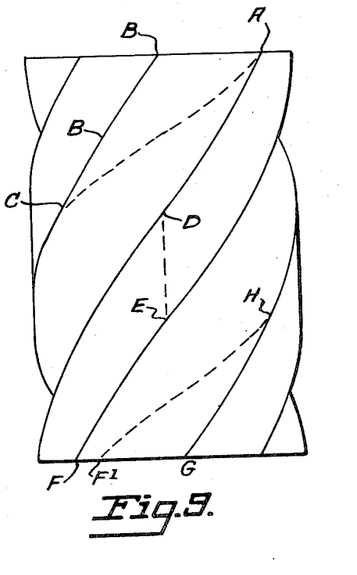

The ports 26 and 29 extend the entire length of the cylinder bores 14 and 15, but their side edges are contoured and located with relation to the axial centers of the cylinder bores 14 and 15 to enable precise timing of port opening and closing by the rotors 19 and 20 as will hereinafter be explained. The outer side edges of the ports 26 and 29 are formed along a helix line conforming to the helix angle of the lobes and sockets of the rotors 19 and 20, as shown in Fig. 4.

Intermediate the ports 26 is a longitudinal bridge member 26a which is merely a deflector to derive some benefit from directing the path of the fluid flow to the rotors. The side edges of the outlet port are similarly contoured for obvious reasons.

The inlet chamber 25 has a portion 25a formed in the head member 17 and extending radially inward with respect to the rotors 19 and 20. The contour of the marginal edge of the inlet chamber portion 25a cooperates with the rotors, as will be described, to affect the time of inlet port opening and closing.

The port 30 in the head member 16 which communicates with the outlet chamber 28 is so located and contoured as to be complemental to the inlet chamber portion 25a and its marginal edges act to affect the time of outlet port opening and closing.

The rotor 19 is formed with radially projecting and helically extending lobes 31. These lobes 31 are provided with surfaces epicycloidal in cross-section transversely of their rotor axis and project from a solid cylinder 33 whose external periphery is precisely at the root diameter of the lobes 31. In this instance, the rotor 19 is formed with three lobes 31 equally spaced apart circumferentially.

The rotor 20 has an external diameter of such size that it will be in rolling contact with the periphery of the cylinder 33 at the root of the lobes 31. The rotor 20 is formed with four helically extending lobe sockets 34 which are complemental to the lobes 31 on rotor 19 to mesh therewith. The lobe sockets 34 are provided with surfaces epitrochoidal in cross-section transversely of their rotor axis. The peripheral speed of the rotor 20 is precisely that of the cylinder 33 at the root of the lobes 31 upon counter-rotation of the rotors due to the geared connection therebetween, as previously set forth.

The rotor 20 is formed with four lobe sockets in that I have determined that three lobes 31 on the rotor 19 and four sockets 34 in the rotor 20 is the most satisfactory from the standpoint of efficiency in operation.

I have determined that a ratio in which the rotor 19 has three teeth and the rotor 20 has four sockets enables a greater displacement per revolution of the rotor 19. By utilizing this ratio, it is possible to use a greater depth of tooth because the corresponding rotor is comparatively larger in diameter than it would be if a ratio of one to one was employed. For example, by employing a rotor 20 of a diameter of 2.250, the depth of the socket 34 is .714. The double depth of the socket 1.428 still leaves .822 base diameter. For this diameter 2.250 of the rotor 20, the diameter of the cylinder 33 of the rotor 19 would be 1.6875. If the design was for one to one ratio, the external diameter of the rotor 20 would be 1.6875. Subtracting the double depth of the socket 1.428 would leave .2595 as the base diameter of rotor 20 which would be too weak structurally.

I have also determined that employing a ratio greater than three to four not only fails to result in an increase in displacement, but does prove objectionable in that it increases the weight and bulk of the rotor 20 and lessens the helix angle of the teeth and sockets, which results in an actual loss in efficiency.

Another favorable result which is obtained by the use of a three to four ratio is that it results in a maximum of favorable turning moment of the rotors in operation. That is to say, the rotor 20 has a normal unfavorable turning moment and the rotor 19 has a normal favorable turning moment which is greater than the unfavorable turning moment of the rotor 20 so that in operation energy from the favorable turning moment of the rotor 19 must be utilized to rotate the rotor 20. Thus the three to four ratio causes the rotor 19 to travel faster than the rotor 20 and results in greater efficiency.

I have determined the maximum permissible helix angle of each tooth of the rotor 19 which is the most efficient, this maximum being such that the angle between two lobes plus the angle of circumferential advance of one tooth in the length of the rotor is not greater than the angle traversed by the rotor throughout its cylinder bore between the points of intersection with the other cylinder bore. This maximum helix angle at the outside diameter of the rotor 19 is approximately 52°. The length of the rotor bears a definite relationship to the lead of the tooth, which relation can be expressed as $$\frac{\text{length}}{\text{lead}} = \frac{1}{2.25}$$

This is the maximum helix angle which will allow one complete tooth of rotor 19 to be in contact with the wall of the cylinder bore for effecting a seal and subject to differential pressure at all times.

It should be pointed out that the relative cross-sectional formation of the lobes 31 and sockets 34 is such that at all times there is a longitudinal sealing contact between the rotors throughout the full length thereof. Such a seal is effected by contact of a lobe edge 31a (which is slightly flattened) with a socket surface 34b, by contact of one or both edges 34a of the socket surfaces with the lobe faces 31b, and by contact between the periphery of the rotor 20 between the sockets 34 and the periphery of the cylinder 33 between the lobes 31.

This seal is diagrammatically illustrated in Figs. 6 to 9, inclusive, in which the rotor 19 is illustrated as rotated ninety degrees clockwise from starting position and rotor 20 is illustrated as rotated ninety degrees counterclockwise from starting position. These arbitrary positions of the rotors were chosen for illustration because the line of sealing effected by the cooperating faces of the rotors can be best illustrated by such rotor positions.

Referring to these figures, it is seen that in proper mesh the edge B at the terminal of one socket of rotor 20 would contact with the rotor 19 at B' which is at the intersection of the lobe and cylinder 33 of rotor 19. This edge B extends along one face of the lobe in sealing contact therewith longitudinally of the lobe and radially outward until the line of contact intersects the outer lobe edge A' at C. This lobe edge A' is in sealing contact with the socket surface from the point C to the point A. Thus a sealing contact is made along a seal line extending from the point C longitudinally and radially outward to the point A at the terminal of the opposite edge of the socket. The sealing line of contact is then formed by engagement of the last named socket edge with the lobe face along a line extending longitudinally and radially inward from A' to D which is at the root of the lobe. At this point the periphery of the rotor 20 is in line sealing contact with the periphery of the cylinder of the rotor 19 from D to E. From this point a sealing line of contact is formed between the socket edge and the face of the lobe which extends longitudinally and radially outward from E to F at the rotor end. The end of the socket is sealed by the end of the cylinder from F to G. Thence a line of sealing contact is made by contact between the socket edge and the lobe face from G to H. A sealing contact is also made between the lobe edge from H to F₂ and the socket surface from H to F₁, as indicated.

Figure 14:
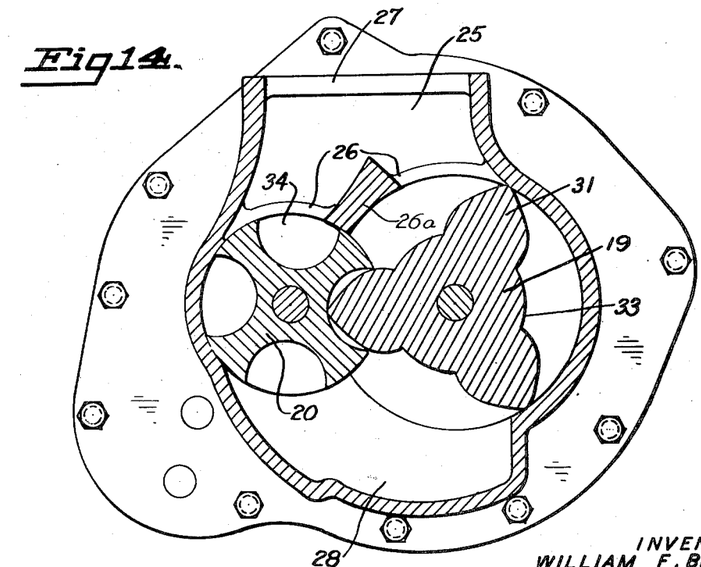
Fig. 14 is an inverted transverse sectional view through the meter taken on line 14—14 of Fig. 4.

The seal line just described, of course, constantly varies during the operation of the rotors due to the helical disposition of the lobes 31 and lobe sockets 34 and the cross-sectional shape thereof. However, the disposition of that seal between the rotors 19 and 20 and the seal lines between the outer peripheries of the rotors and the cylinder walls, taken in conjunction with the helical angle of the lobes 31 and lobe sockets 34, so disposes the surfaces of the lobes 31 and lobe sockets 34 to the inlet and outlet pressures that the differential between those two pressures results in rotation of the rotor 19 in the correct direction (clockwise in the arrangement depicted in Fig. 14), and rotor 20 in the incorrect direction (counterclockwise in the arrangement depicted in Fig. 14), with a resultant rotation of both rotors in the correct direction for any given pressure differential. The ratio between the resultant force tending to rotate the rotors 19 and 20 in the correct direction upon the creation of a pressure differential between the inlet and outlet sides of the rotors 19 and 20 and the forces resisting such rotation is of the order of four to one.

It is desired to point out here that the formation of the rotors 19 and 20 and their lobes 31 and lobe sockets 34, which causes them to rotate with substantially constant torque for any given pressure differential, results in a meter having substantially constant hydraulic characteristics.

Figure 1:
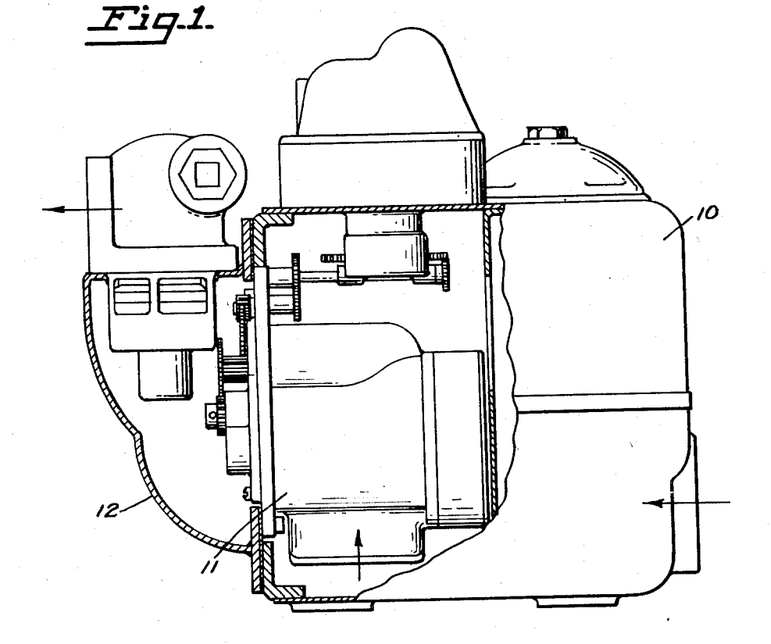
Fig. 1 is a view in central vertical section through a meter embodying the preferred form of my invention.
Figure 2:
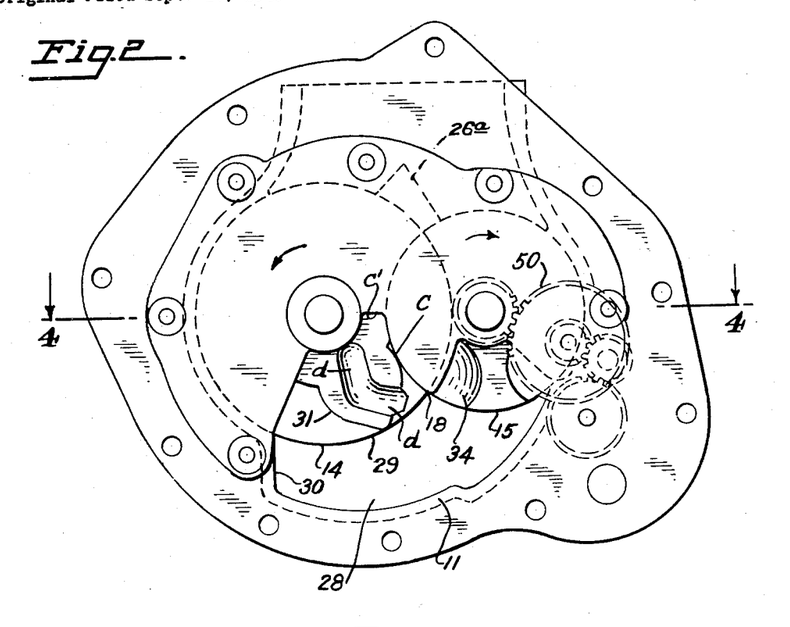
Fig. 2 is a view in elevation of the discharge end of the meter.
Figure 3:
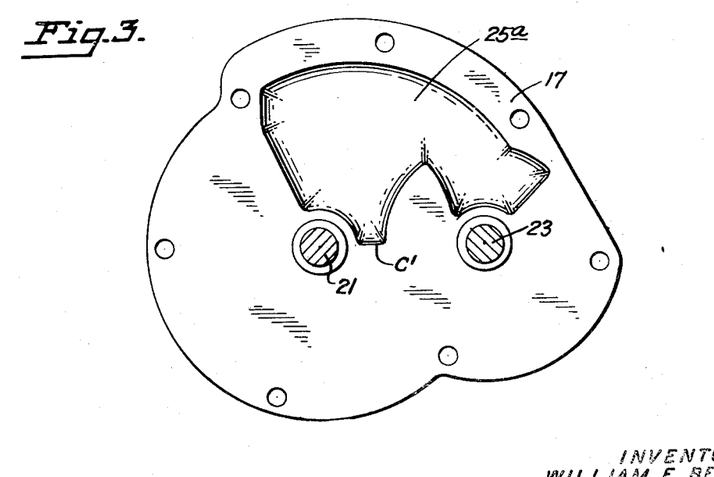
Fig. 3 is a view of the interior face of one of the head members of the meter, showing the manner in which the inlet chamber is extended radially inward with respect to the rotors.
Figure 10:
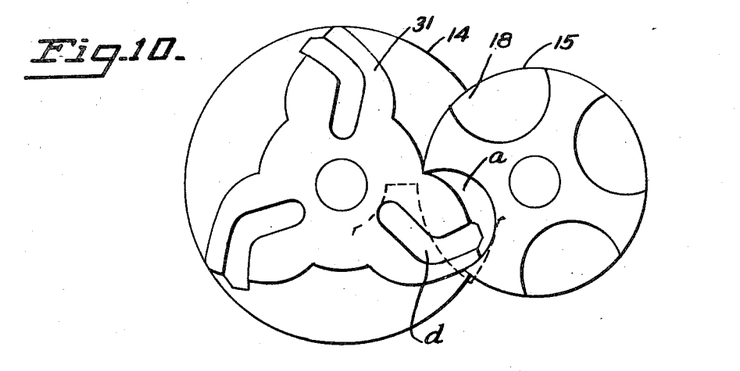
Figs. 10 to 12, inclusive, are diagrammatic views, showing the manner in which the trapped liquid is by-passed to the outlet chamber immediately as a socket changes from communication with the outlet port to communication with the inlet port.
Figure 11:
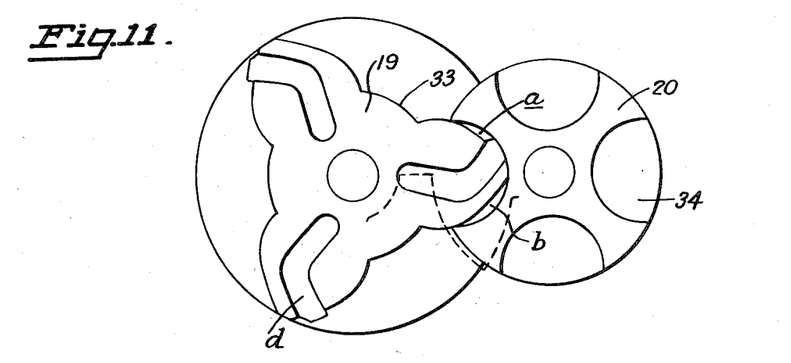
Figure 12:
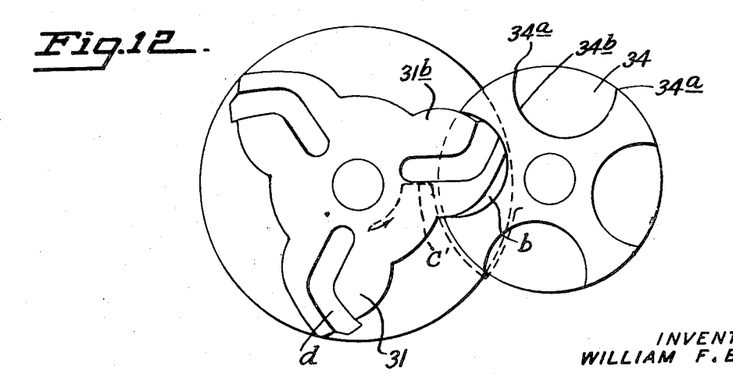
Figure 13:
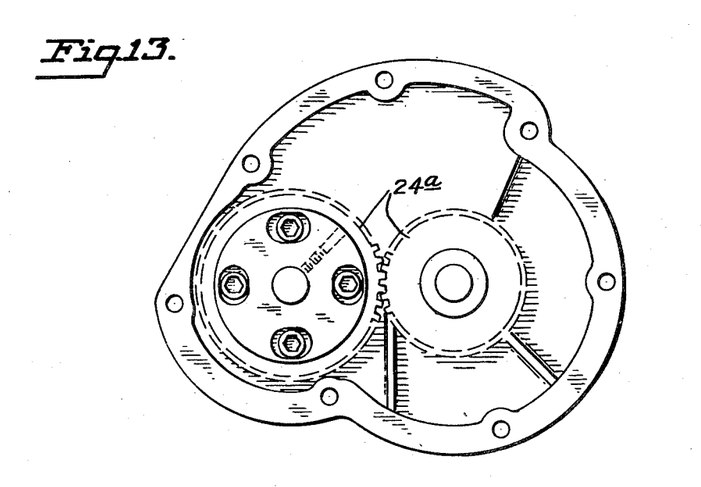
Fig. 13 is an end view, showing the gear connection between the rotors.

Just prior to a lobe 31 completely traversing a lobe socket 34 and displacing the liquid therefrom endwise into the outlet chamber, an end seal must be effected to prevent communication between the inlet and outlet chambers through that socket. In Figs. 10 to 12, inclusive, a lobe 31 is shown at this point and it is seen that a pocket of outlet liquid $a$ is disposed between one face of the lobe 31 and the socket 34. As the lobe 31 continues to advance, a pocket $b$ is formed between the opposite face of the lobe 31 and the socket 34, which pocket $b$ will be in communication with the inlet chamber while the pocket $a$, which is gradually diminishing, will be in communication with the outlet chamber. Obviously, it is necessary that a seal be effected to prevent inlet liquid from by-passing axially through the socket through the pocket $b$ into the outlet. For this reason the contour of the port 30 at the end of the outlet chamber is formed to effect an end seal. The seal line of the port 30 of the outlet chamber is shown in Fig. 2 at $c$ and will effect a seal over the socket 34 when it arrives at the position shown in Fig. 10. It is seen that this seal line $c$ is such that it completely seals in the socket when it arrives in the position shown in Fig. 10, but at this time it is necessary, in order to prevent an attempt at compression of the liquid in pocket $a$, that this pocket communicate with the outlet chamber.

For this reason passageways $d$ are formed in the end face of each lobe which communicate with the leading face of the lobe and then extend radially inward so that they will be in communication with the end outlet chamber until the point or sealing edge of the lobe substantially completely traverses the socket, as shown in Fig. 12. Therefore, the outlet liquid in the pocket $a$ will pass radially inward of the lobe and discharge into the end outlet chamber.

When the lobe 31b reaches the position shown in Fig. 12, the seal line $c'$ of the port 30 of the outlet chamber registers with the trailing edge of the passageway $d$ and seals off that passageway from the outlet chamber.

At the opposite end of the casing 11, the seal line of the portion 25a of the inlet chamber is precisely in register with the seal line of the port 30 of the outlet end chamber. At this end the lobes 31 are formed with passageway $d'$ similar to the passageways $d$ except that they extend through the trailing edge of the lobe 31 and act to prevent an attempt to draw a partial vacuum between a lobe 31 and its socket as it changes from communication with the inlet chamber or port to communication with the outlet chamber or port.

In operation of the meter, it is constructed and assembled as shown in the drawings, and, of course, inlet fluid under pressure is directed to the inlet chamber. The outlet chamber is in communication with the discharge line, preferably connected to the secondary casing 12. Obviously, there will be a pressure differential between the inlet and outlet fluid, which pressure differential need not be very great because my present meter will operate under a small pressure differential in favor of the inlet side. The helix angle of the lobes 31 and sockets 34 and the contours of the inlet and outlet ports are such that the fluid pressure differential will so exert itself on the faces of the lobes and sockets as to cause the rotors 19 and 20 to rotate in a metering direction. As the sockets open to the inlet ports 26, they will be filled with fluid, and when they commence to mesh with a complementary lobe, the latter will progressively and axially displace the liquid in the socket and discharge the liquid into the outlet chamber without at any time enabling communication to be established between the inlet and outlet chambers.

Immediately as the socket changes from communication with the outlet chamber to communication with the inlet chamber, it is sealed from the outlet chamber and the small amount of trapped fluid will by-pass through the passageways $d$ into the outlet chamber, as described. Likewise, as the sockets change from communication with the inlet chamber to communication with the outlet chamber, the end of the socket is likewise sealed off, but communication between the isolated space between the socket and lobe remains in communication with the inlet chamber, as described.

The rotor 20 is geared to a counter drive transmission 50, as shown in Fig. 2, in order that the liquid passed through and measured by the meter will be translated into gallons or other units of measure by a proper counter. Inasmuch as the counter does not form any part of my present invention, it is not illustrated.

Formulae are given below for designing the pertinent elements of an actual meter in accordance with the present invention, which embodies cooperable helical epicycloidal teeth and epitrochoidal sockets. It is to be understood, however, that other tooth and socket forms may be used, although those specified are preferred. The following formulae are based upon a helix angle at the outside diameter of the 3 tooth rotor 19 of 55° 25':

A = lead 3T (3 tooth) rotor = estimate
B = O. D. 3T rotor = A/2.1666
C = root diam. 3T rotor = B × .5416
D = O. D. 4T (4 tooth) rotor = 4/3 × C
E = center distance = C + D/2
F = length of rotors = A/2
$G^1$ = displacement per one rev. of 4T rotor, cu. in. = $\left(\frac{E}{3.5}\right)^2 \times 21.9324 \times F$ (add 1% for slippage)
$G^2$ = displacement per one rev. of 3T rotor, cu. in. = 3/4 × $G^1$
H = lead 4T rotor = 4/3A
J = R. P. M. 4T rotor = G. P. M./$G^1$ (in gal.)
K = velocity thru meter in F. P. S. = $\frac{\left(\frac{B-C}{2}+C\right)\pi M + \left(D - \frac{B-C}{2}\right)\pi L}{24} = L\frac{B+7C+6D}{45.8365}$ L = R. P. S. 4T rotor = J/60
M = R. P. S. 3T rotor = 4/3 × L
N = rev. per gal. of 3T rotor = 231/$G^2$
P = junction of helix angles in body = F × .0625 or 1/36 × A Using the above formulae, specifications of an actual meter are given herewith, based upon helical epicycloidal teeth and epitrochoidal sockets, the 3 tooth rotor 19 having a helix angle of 55° 25':

A = lead 3T rotor = 10.0
B = O. D. 3T rotor = 4.615
C = R. D. 3T rotor = 2.500
D = O. D. 4T rotor = 3.333
E = center distance = 2.9166
F = length = 5.0"
$G^1$ = displacement per one rev 4T rotor = 76.14 in.$^3$ (with 1% included for slippage = 76.9 in.$^3$)
$G^2$ = displacement per one rev 3T rotor = 57.67 in.$^3$ (with 1% included for slippage)
H = lead 4T rotor = 13.333
J = R. P. M. 4T rotor = @ 150 G. P. M. = 450 R. P. M. @ 200 G. P. M. 600 R. P. M. @ 250 G. P. M. = 750 R. P. M.
K = velocity thru meter = @ 150 G. P. M. = 7 F. P. S. @ 200 G. P. M. = 9 F. P. S. @ 250 G. P. M. = 12 F. P. S.
L = rev. 4T rotor in R. P. S. = @ 150 G. P. M. = 7.5 R. P. S.
M = rev. 3T rotor in R. P. S. = @ 150 G. P. M. = 10.0 R. P. S.
N = rev. 3T rotor per gallon = 4.0055
P = junction of helix = .281

From the foregoing it is obvious that I have provided a very efficient positive displacement liquid meter which will accurately and efficiently measure liquid with a minimum of pressure drop across the meter. And as recognized in the art "positive displacement" signifies the presence of pockets which isolate the liquid at least momentarily from both inlet and outlet ports.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A positive displacement liquid meter comprising a casing having a pair of parallel intersecting cylindrical bores, said casing having an inlet chamber formed therein exteriorly of one side of the bores and an outlet chamber exteriorly of the other side of the bores, said casing having an inlet port between the inlet chamber and the bores and an outlet port between the outlet chamber and the bores, a first rotor rotatably mounted in one bore, a second rotor rotatably mounted in the other bore, the first rotor having at least three radially projecting helically extending lobes having surfaces epicycloidal in cross-section transversely of their rotor axis and of an outer diameter sealingly fitting the bore, the second rotor having a diameter sealingly fitting its bore and engaging the periphery of the first rotor at the root of the lobes, a connection between the rotors whereby they will rotate in counterdirections with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors and thereby between the inlet and outlet ports, said inlet port extending on opposite sides of the line of intersection between the outer diameters of the rotors and the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors.

2. A positive displacement liquid meter comprising a casing having a pair of parallel intersecting cylindrical bores, said casing having an inlet chamber formed therein exteriorly of one side of the bores and an outlet chamber exteriorly of the other side of said bores, said casing having an inlet port between the inlet chamber and the bores and an outlet port between the outlet chamber and the bores, a first rotor rotatably mounted in one bore, a second rotor rotatably mounted in the other bore, the first rotor having at least three equally circumferentially spaced radially projecting helically extending lobes having surfaces epicycloidal in cross-section transversely of their rotor axis and of an outer diameter sealingly fitting the bore, the second rotor having a diameter sealingly fitting its bore and engaging the periphery of the first rotor at the root of the lobes, a gear connection between said rotors whereby the peripheral speed of the second rotor will be the same as the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors and thereby between the inlet and outlet chambers, the angle between two lobes plus the angle of circumferential advance of one tooth in the length of the rotor not exceeding the angle traversed by the first rotor throughout its cylinder bore between the points of intersection with the other cylinder, said inlet port extending on opposite sides of the line of intersection between the outer diameters of the rotors and the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors.

3. A positive displacement liquid meter comprising a casing having a pair of parallel intersecting cylindrical bores, said casing having an inlet chamber formed therein exteriorly of one side of the bores and an outlet chamber exteriorly of the other side of the bores, said casing having an inlet port between the inlet chamber and the bores and an outlet port between the outlet chamber and the bores, a first rotor rotatably mounted in one bore, a second rotor rotatably mounted in the other bore, the first rotor having at least three radially projecting helically extending lobes having surfaces epicycloidal in cross-section transversely of their rotor axis and of an outer diameter sealingly fitting the bore, the second rotor being of a diameter sealingly fitting its bore and engaging the periphery of the first rotor at the root of the lobes, a connection between the rotors whereby they will rotate in counterdirections with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors and thereby between the inlet and outlet ports, the angle between two lobes plus the angle of circumferential advance of one tooth in the length of the rotor not exceeding the angle traversed by the first rotor throughout its cylinder bore between the points of intersection with the other cylinder, said inlet port extending on opposite sides of the line of intersection between the outer diameters of the rotors and the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors, passage means for conducting liquid trapped between a lobe and a socket to the outlet chamber immediately as the socket changes from communication with the outlet chamber to communication with the inlet chamber without establishing a communication between the inlet and outlet ports.

4. A positive displacement liquid meter comprising a casing having a pair of parallel intersecting cylindrical bores, said casing having an inlet chamber formed therein exteriorly of one side of the bores and an outlet chamber exteriorly of the other side of the bores, said casing having an inlet port between the inlet chamber and the bores and an outlet port between the outlet chamber and the bores, a first rotor rotatably mounted in one bore, a second rotor rotatably mounted in the other bore, the first rotor having at least three radially projecting helically extending lobes having surfaces epicycloidal in cross-section transversely of their rotor axis and of an outer diameter sealingly fitting the bore, the second rotor being of a diameter sealingly fitting its bore and engaging the periphery of the first rotor at the root of the lobes, a connection between the rotors whereby they will rotate in counterdirections with the peripheral speed of the second rotor being equal to the peripheral speed of the first rotor at the root of the lobes, the second rotor having at least four helically extending sockets having surfaces epitrochoidal in cross-section transversely of their rotor axis and complemental to the lobes to mesh therewith to form a constant liquid seal longitudinally between the rotors and thereby between the inlet and outlet ports, the angle between two lobes plus the angle of circumferential advance of one tooth in the length of the rotor not exceeding the angle traversed by the first rotor throughout its cylinder bore between the points of intersection with the other cylinder, said inlet port extending on opposite sides of the line of intersection between the outer diameters of the rotors and the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors, passage means for conducting liquid trapped between a lobe and a socket to the outlet chamber immediately as the socket changes from communication with the outlet chamber to communication with the inlet chamber without establishing a communication between the inlet and outlet ports, and passage means for conducting fluid from the inlet port to between a lobe and a socket as a socket changes from communication with the inlet port to communication with the outlet port to prevent drawing a partial vacuum and without establishing communication between the inlet and outlet ports.

5. A positive displacement liquid meter comprising a casing having a pair of parallel intersecting cylindrical bores, said casing having an inlet chamber formed therein exteriorly of one side of the bores and an outlet chamber exteriorly of the other side of the bores, said casing having an inlet port between the inlet chamber and the bores and an outlet port between the outlet chamber and the bores, a first rotor rotatably mounted in one bore, a second rotor rotatably mounted in the other bore, the first rotor having three radially projecting helically extending lobes having surfaces epicycloidal in cross-section transversely of their rotor axis and of an outer diameter sealingly fitting the bore, the second rotor having a diameter sealingly fitting its bore and engaging the periphery of the first rotor at the root of the lobes, a connection between the rotors whereby they will rotate in counterdirections with the peripheral speed of the second rotor being equal to the peripheral speed of the first rotor at the root of the lobes, the second rotor having four helically extending sockets having surfaces epitrochoidal in cross-section transversely of their rotor axis and complemental to the lobes to mesh therewith to form a constant liquid seal longitudinally between the rotors and thereby between the inlet and outlet ports, said inlet port extending on opposite sides of the line of intersection between the outer diameters of the rotors and substantially the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors.

6. A positive displacement liquid meter comprising a casing having a pair of parallel intersecting cylindrical bores, said casing having an inlet chamber formed therein exteriorly of one side of the bores and an outlet chamber exteriorly of the other side of the bores, said casing having an inlet port between the inlet chamber and the bores and an outlet port between the outlet chamber and the bores, a first rotor rotatably mounted in one bore, a second rotor rotatably mounted in the other bore, the first rotor having three radially projecting helically extending lobes having surfaces epicycloidal in cross-section transversely of their rotor axis and of an outer diameter sealingly fitting the bore, the second rotor being of a diameter sealingly fitting its bore and engaging the periphery of the first rotor at the root of the lobes, a connection between the rotors whereby they will rotate in counterdirections with the peripheral speed of the second rotor being equal to the peripheral speed of the first rotor at the root of the lobes, the second rotor having four helically extending sockets having surfaces epitrochoidal in cross-section transversely of their rotor axis and complemental to the lobes to mesh therewith to form a constant liquid seal longitudinally between the rotors and thereby between the inlet and outlet ports, the angle between two lobes plus the angle of circumferential advance of one tooth in the length of the rotor not exceeding the angle traversed by the first rotor throughout its cylinder bore between the points of intersection with the other cylinder, said inlet port extending on opposite sides of the line of intersection between the outer diameters of the rotors and the entire length of the rotors and having oppositely converging helical side edges one conforming to the helix angle of the sockets and the other to the helix angle of the lobes and intersecting at one end of the rotors at the point of intersection of the outer diameters of the rotors, said outlet port being formed similarly to the inlet port but with its helical side edges intersecting at the point of intersection of the outer diameters of the rotors at the opposite end of the rotors, passage means for conducting liquid trapped between a lobe and a socket to the outlet chamber immediately as the socket changes from communication with the outlet chamber to communication with the inlet chamber without establishing a communication between the inlet and outlet ports, and passage means for conducting fluid from the inlet port to between a lobe and a socket as a socket changes from communication with the inlet port to communication with the outlet port to prevent drawing a partial vacuum and without establishing communication between the inlet and outlet ports.

7. A positive displacement liquid meter such as defined in claim 1 wherein the ends of said casing are provided with outwardly extending pockets overlying the intermeshing portions of said rotors, and wherein the lobes of said first rotor are provided at one end thereof with channels extending through the leading faces thereof and wherein said lobes are provided at their opposite ends with channels extending through the trailing faces thereof.

8. A positive displacement liquid meter of the character described comprising first and second casing head members; a first rotor journaled in said casing head members and provided with four helical lobes defining intermediate helical sockets of trochoidal configuration; a second rotor journaled in said casing heads and provided with three helical lobes of epicycloidal configuration meshing and forming a liquid seal with the lobes of said first rotor; a first casing side portion overlying said first rotor and formed on a radius substantially equal to the radius of said first rotor, said side portion being bounded by helical side edges in substantial parallelism with the lobes of said first rotor and extending substantially throughout the length of said rotor, said side edges subtending an angle at least as great as the angle subtended by two adjacent lobes of said first rotor; a second casing side portion overlying said second rotor diametrically opposite said first casing side portion and formed on a radius substantially equal to the radius of said second rotor, said second casing side portion being bounded by helical side edges in substantial parallelism with the lobes of said second rotor and extending substantially throughout the length thereof, said side edges subtending an angle at least as great as the angle subtended by two adjacent lobes of said second rotor; liquid delivery and discharge chambers merging with the said side edges of said first and second casing side portions; and means responsive to the rotation of one of said rotors for rotating the other of said rotors.

9. A positive displacement liquid meter of the character defined in claim 8 wherein said casing head members are provided with outwardly extending pockets overlying said discharge chamber and extending over the meshing zone of said rotors, and wherein the lobe faces of said second rotor are provided at one end of said rotor with channels extending through the leading faces of said lobes and at their opposite ends with channels extending through the leading faces thereof.

WILLIAM F. BERCK.

REFERENCES CITED

The following references are of record in the file of this patent:

UNITED STATES PATENTS

| Number | Name | Date |
|---|---|---|
| 2,243,874 | Lysholm | June 3, 1941 |
| 2,287,716 | Whitfield | June 23, 1942 |
| 2,325,617 | Lysholm | Aug. 3, 1943 |
| 2,441,771 | Lysholm | May 18, 1948 |

FOREIGN PATENTS

| Number | Country | Date |
|---|---|---|
| 528,678 | France | Aug. 23, 1921 |